United States Patent [19]

Godinez et al.

[11] 3,842,316

[45] Oct. 15, 1974

[54] TRANSITION PROGRAMMER

[75] Inventors: Peter A. Godinez, West Covina; Robert R. Shepard, Lakewood, both of Calif.

[73] Assignee: Genisco Technology Corporation, Compton, Calif.

[22] Filed: Dec. 6, 1972

[21] Appl. No.: 312,644

[52] U.S. Cl. ........................ 317/5, 105/76, 290/17, 318/83
[51] Int. Cl. .......................................... H02p 5/28
[58] Field of Search ............. 317/5; 318/83, 86–89, 318/111, 312, 326, 147, 328; 290/3, 14, 17, 45; 105/76, 61; 180/105 E; 324/173; 246/182 C, 187; 307/233; 328/48, 72; 340/259, 164 R

[56] References Cited
UNITED STATES PATENTS

| | | | |
|---|---|---|---|
| 2,617,970 | 11/1952 | Justus | 290/17 X |
| 3,110,853 | 11/1963 | Jones | 318/312 |
| 3,201,756 | 8/1965 | Young | 340/164 |
| 3,709,034 | 1/1973 | Herzl | 307/233 X |

Primary Examiner—J. D. Miller
Assistant Examiner—Harry E. Moose, Jr.
Attorney, Agent, or Firm—Fraser and Bogucki

[57] ABSTRACT

A diesel-electric locomotive transition programmer includes a digital axle speed transducer and digital solid state logic isolated from transients in the environment of a moving locomotive. A signal representing the speed of a traction motor, sensed by the transducer, is filtered. Digital components of the filtered signal are counted over a fixed time interval. The value of the count is decoded to selectively actuate relays which isolate the solid state circuitry from transients. Relay outputs drive locomotive transition relays to appropriately energize the shunt windings of locomotive traction motors.

8 Claims, 3 Drawing Figures

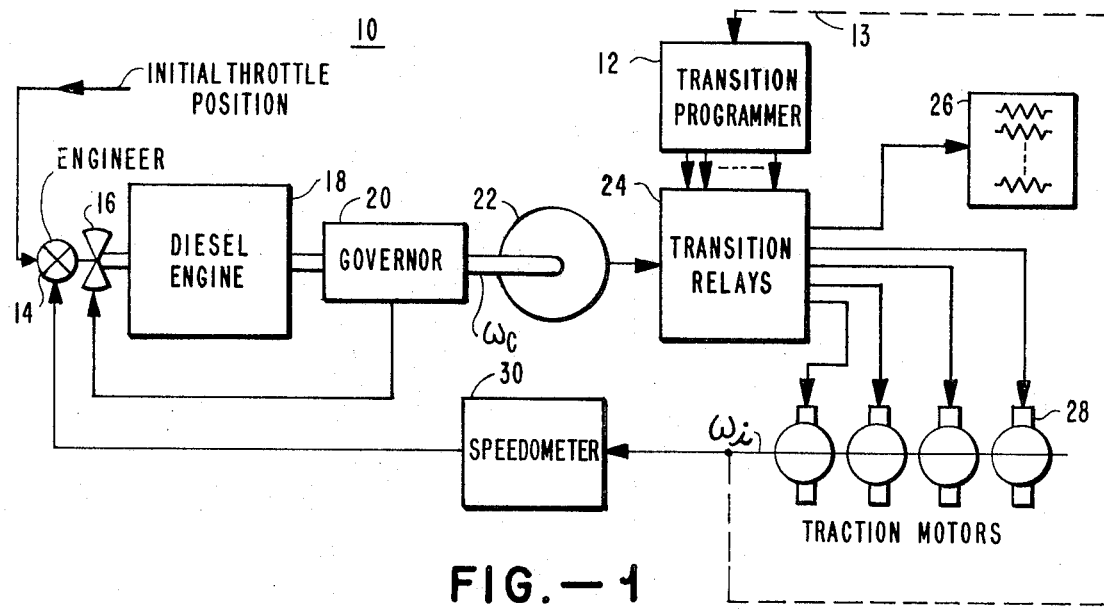
FIG.—1
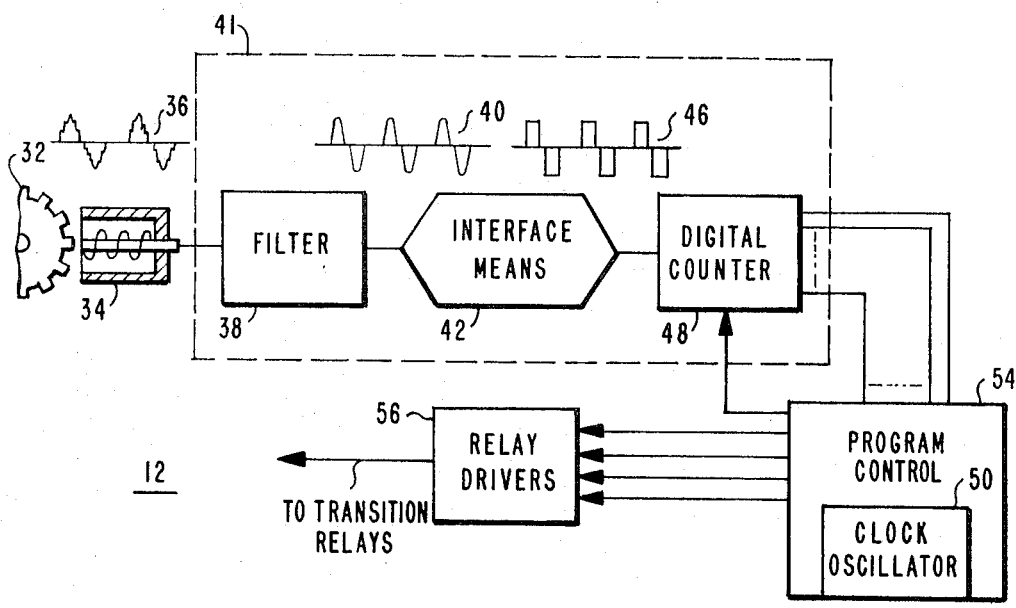
FIG.—2

TRANSITION PROGRAMMER

BACKGROUND OF THE INVENTION

1. Field of the Invention

This invention relates to transition programmers. More particularly this invention relates to an improved electronic transition programmer for use in diesel electric locomotives.

2. Description of the Prior Art

Fuel is a major cost in shipping freight by locomotive. Thus, it is desirable to minimize fuel consumption. A transition programmer is a device which helps to provide an optimal power transfer from a diesel engine to electric traction motors in a locomotive, thereby aiding the conservation of fuel and providing an optimal tractive effort.

In the usual diesel electric locomotive, a diesel engine drives one or more generators (or alternators). Each generator drives a plurality of traction motors joined to axles of the locomotive which in turn drive the wheels.

Theoretically, maximum power transfer occurs when the impedance seen by the generator approximates that seen by the traction motors. Practically, for the sake of size, cost and weight, the generators have voltage and current limitations which prevent achieving a maximum power transfer. If voltage limitations are exceeded, arcing occurs. If current limitations are exceeded, the generator overheats.

It is well known that a DC electric motor generates a back electromotive force (EMF) which opposes the potential applied to the motor windings. The magnitude of this back EMF is proportional to the rate of rotation of the electric motor. Thus, at high speeds the high back EMF of the traction motors make it necessary for the generator to maintain high voltages in order to deliver power to the wheels. Conversely, at low speeds, the low back EMF of the traction motors may cause current overloading of the generator.

To avoid exceeding the limitations of the generator, the traction motors are often connected in series (or series-parallel) across the generator at low speeds and in parallel at higher speeds. The series connection allows the full generator current to flow through each traction motor, while the back-EMFs add to allow the generator voltage to be high enough to deliver full power to the wheels. The parallel connection greatly reduces the generator voltage requirement at higher speeds since the back-EMFs are no longer series-adding. Thus it is possible to drive the traction motors at full power over a wide range of locomotive speeds and remain within the limitations of the generator if the traction motors are wired in a proper configuration.

A transition programmer controls the wiring arrangement of the traction motors in accordance with the magnitude of the back EMF or the speed of the traction motors. In the past, transition programmers would typically obtain analog voltage and current measurements at various points in the traction motor circuits. These measurements would be communicated to electromechanical circuitry which would in turn energize particular transition relays to wire the traction motors at appropriate speed transitions. Often, malfunctions or maladjustments in the sensing circuits would cause an inaccurate representation of the speed of the traction motors. Transitioning would occur at improper speeds which would often go unnoticed.

Further problems of reliability resulted from the use of the transition programmers in the high vibrational environment of a locomotive. The large number of electromechanical relays and other devices prevented reasonably maintenance-free use. Further, such maintenance was time consuming and expensive, since locomotives could not be used during repair.

Another method of preventing the main generator from exceeding its limitations is by adding a shunt resistance across the traction motor field windings. Shunt resistors reduce the back-EMF of the traction motors thereby enabling an optimal transfer of power thereto. Shunt resistors have been used in the past to effect intermediate or minor transitions between the major transitions or speeds where the wiring configuration of the traction motors are changed. It should be apparent that accuracy and reliability in speed measurement are important in achieving useful minor transitions.

Dynamic braking is frequently used in diesel-electric locomotives. Dynamic braking is a method of slowing down a train by connecting the traction motor windings to a series of dissipating resistors. The traction motors act as generators while the dissipating resistors put a load on the windings slowing down the motors and therefore slowing down the train.

In the process of dynamic braking at low speeds, such as the order of 0 to 20 mph, it is desirable that there also be transitioning. The voltage generated by the traction motors is related to the speed of the train. As the traction motors slow down, the voltage across the windings of the traction motor is reduced, limiting the energy available for absorption by the dissipating resistors. Thus at lower speeds, a transition programmer is useful in increasing the effective braking action of the dissipating resistors by varying the traction motor winding configuration or by changing the resistance of the dissipating resistors. Here, also, accuracy in speed determination and reliability is important. Thus, it would be desirable to have a reliable transition programmer for controlling dynamic braking.

Typically in a transition programmer, it is desirable to have transitions at accurately defined speeds. For example, it is beneficial to activate transitions at five-eighths mile per hour increments. Also it is desirable to assure a switching accuracy, for example, of ± five-sixteenths mile per hour ± 1 percent of speed over the full speed range. It should be apparent that a relatively precise speed measuring method must be used, and that such precision is difficult to achieve in the rugged environment of a locomotive.

Therefore it is desirable to have a transition programmer which has a high degree of reliability and accuracy for practical use in diesel electric locomotives. Also it is desirable to have a reliable transition programmer suitable for dynamic braking.

SUMMARY OF THE INVENTION

A transition programmer in accordance with this invention generally includes a sensor for generating a waveform having a digital component. The digital component bears a relationship to the speed developed by a traction motor in a diesel electric locomotive. A digital signal processor is coupled to the sensor for selectively energizing relays in response to the digital component of the waveform. The signal processor is substantially solid state for reliability. A plurality of relays are coupled to the signal processor for energizing locomotive transition relays. The transition relays couple elements such as traction motor windings, shunt resistors and energy dissipating resistors to the locomotive power circuits.

BRIEF DESCRIPTION OF THE DRAWINGS

Other objects and advantages of the invention will become apparent from a reading of the detailed specification accompanied by the drawings, in which:

FIG. 1 is a diagram of a diesel electric locomotive system utilizing a transition programmer;

FIG. 2 is a block diagram of a transition programmer in accordance with this invention.

DETAILED DESCRIPTION OF THE DRAWINGS

Figure 3:
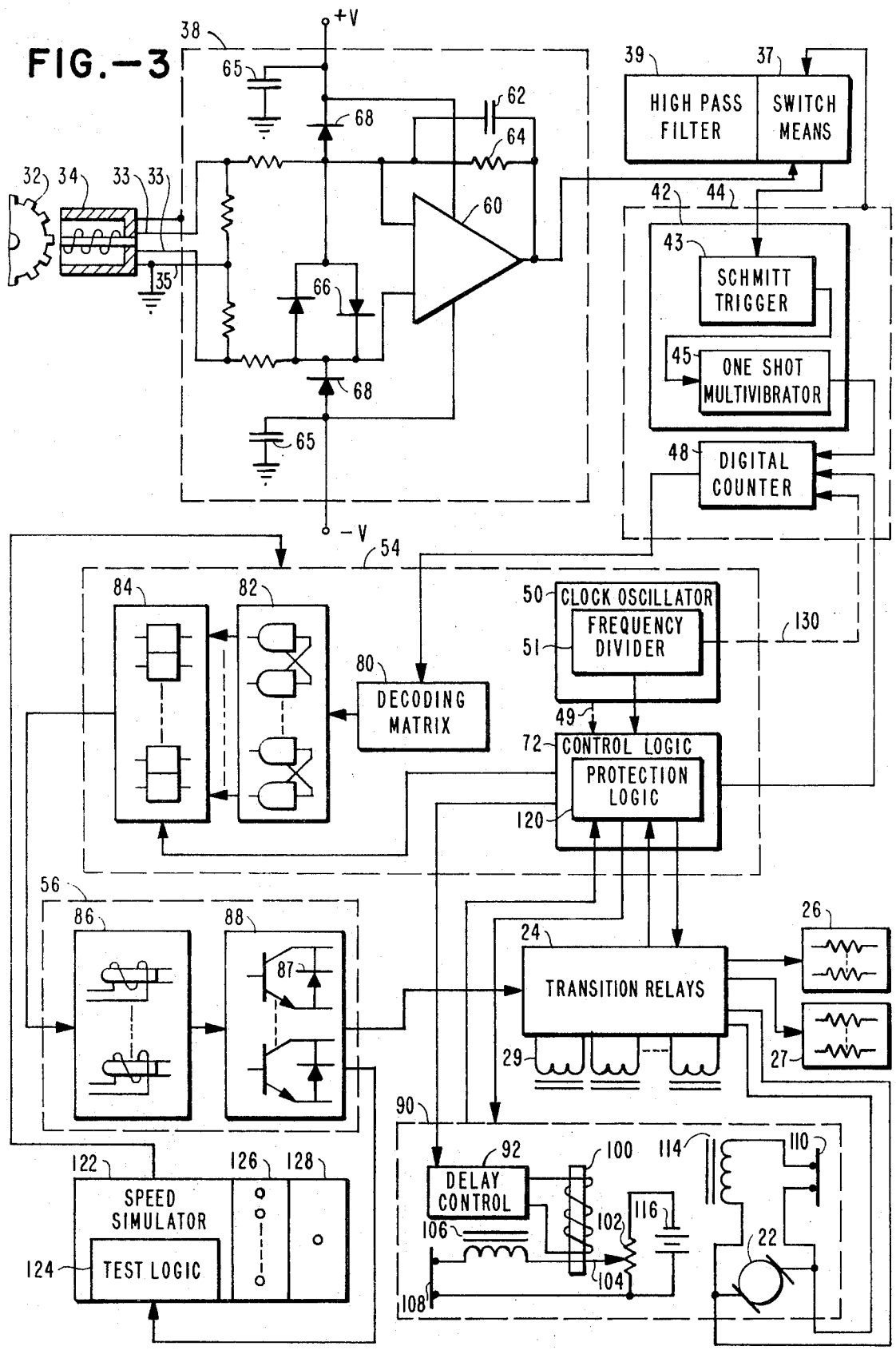
FIG. 3 is a diagram of a transition programmer in accordance with a preferred embodiment of this invention containing detailed examples of the blocks pictured in FIG. 2.

Referring to FIG. 1, the power system of a diesel electric locomotive is shown to illustrate the function of the transition programmer. Power system 10 generally comprises a diesel engine 18 having an adjustable fuel valve 16 which is controlled by governor 20. The engineer generally operates a throttle represented by control 14 which usually has a plurality of fixed settings. Starting at a particular setting, the throttle causes the governor 20 to control valve 16 to feed an appropriate flow of fuel to diesel engine 18. The speed of rotation by diesel engine 18 is sensed by governor 20. Governor 20 is a servo unit used to drive diesel engine 18 to a constant speed $\omega_c$. Governor 20 causes valve 16 to vary the fuel flow according to the deviation of the speed of rotation from $\omega_c$. Generator 22 is therefore driven to rotate at a constant speed. The power from generator 22 is communicated to traction motors 28 through transition relays 24. The wiring configuration of the traction motor windings is determined by which of transition relays 24 are energized. The speed at which the traction motors turn controls the speed of the locomotive. The engineer monitors the speed by observing a speedometer 30 and may readjust the multi-position throttle accordingly. Broken line 13 indicates that a signal representing the speed of the traction motors in the preferred embodiment is fed to transition programmer 12. The transition programmer 12 accordingly determines which of the transition relays 24 to energize. Transition relays 24 also control shunt resistors 26. Shunt resistors 26 are wired across the windings of traction motors 28 so as to effect intermediate or minor transitions. Thus, the transition programmer operates in the context of a diesel electric locomotive for energizing transition relays so as to correctly wire windings of traction motors and deliver an optimal tractive effort.

Referring more particularly to FIG. 2, a diagram of a transition programmer is shown having an axle gear 32 and a magnetic sensor 34. Axle gear 32 and magnetic sensor 34 comprise an axle transducer or digital sensor. The sensor generates a digital waveform representing the speed of a traction motor and therefore relating to the back EMF of the traction motor. Axle gear 32 having a plurality of teeth is rigidly attached to a locomotive axle and rotates in accordance therewith. Such a speed transducer is advantageous for its reliability since there is no contact between the gear teeth and the magnetic sensor 34. Other speed transducers may be used provided that they generate a digital component having a relationship corresponding to the angular speed of the traction motors.

Generally the digital signal processing means comprises a signal preparation means 41 and program control 54. The signal from the magnetic sensor 34 is converted by the signal preparation means 41 to a digital count representative of the speed of the traction motors 28. The count provided by signal preparation means 41 is compatible with the program control 54. The signal preparation means 41 preferably comprises count preparation means, which may include filter 38 and interface 42, and count means such as a digital counter 48.

Waveform 36, for illustrative purposes only, represents a portion of a signal generated by the magnetic sensor 34. The waveform has a digital component resembling an intermittent sine wave. Higher frequency noise components are superimposed on the digital component. These noise components are believed to be caused by rail shock, drive gears and cable pickup. Also not pictured is a low frequency noise component believed to be caused by a shock induced magnetic orientation of the axle gear 32. It is desirable to suppress the noise components in order that the digital component be accurately measured. Therefore filter 38 is included in the transition programmer of FIG. 2. Filtering may be accomplished by any of the methods well known in the art through a preferred filtering technique will be discussed below. Waveform 40 schematically represents a filtered signal. Generally, the signal processing means includes a digital counter. Interface means 42 compatibly couples filter 38 to digital counter 48. For example, one form of counter requires squaring the signal as shown in waveform 46, which is provided by interface means 42.

Digital counter 48 is typically a solid state counter which is reset at fixed intervals by program control 54. Resetting digital counter 48 by program control 54 defines the interval over which the speed representation of the traction motors is determined. The speed representation is obtained by counting certain of the peaks of waveform 46 representing angular axle displacements during the time interval. Digital counter 48 has a plurality of outputs which are energized to represent the angular speed of the traction motors thereby obtained.

Program control 54 generally delivers clocking signals, such as derived from a clock oscillator 50, to digital counter 48. Program control 54 has means for storing information relating to the speed of the traction motors received at the last sampling. At appropriate intervals, the program control gates the stored information to relay drivers 56. The relay drivers 56 in turn energize the transition relays (not shown) which are isolated from the electrically sensitive solid state circuitry of the transition programmer.

Referring generally to FIG. 3, an axle transducer 32 is shown in proximity to a magnetic sensor 34 having two inner leads 33 and a grounded shield conductor 35 extending therefrom. In this preferred embodiment the two inner leads 33 carry signals with respect to shield conductor 35 which are generally of equal magnitude but opposite in polarity.

Filter 38 preferably comprises an active circuit element such as operational amplifier 60 in the form of an integrated circuit chip or other solid state active element. The operational amplifier 60 is connected to provide common mode rejection to suppress stray signals picked up by the two inner leads 33 of the magnetic sensor 34. Operational amplifier 60 is wired as an integrator with capacitor 62 and resistor 64 providing a feedback loop. The operational amplifier is frequency dependent such that higher frequency noise components are effectively suppressed. Usually, the amplitude of a waveform generated by a magnetic sensor is speed dependent. The amplifier 60 may be connected to provide a transfer function having a negative slope so that the amplitude peaks are stabilized irrespective of a change in speed. Diodes 66 prevent transients from exceeding a maximum input signal swing such as about one-half volt across operational amplifier 60. Diodes 68 prevent the absolute voltage of circuit element 60 from exceeding a limit such as 15 volts for example. Capacitors 65 isolate filter 38 from power supply transients. A high pass filter 39 is connected to filter 38 and interface means 42. Switch means 37, schematically indicated adjacent high pass filter 39, couples the high pass filter 39 between filter 38 and interface means 42 above a predetermined frequency. A low frequency noise component believed to be caused by a magnetization of axle gear 32 is sometimes present. This low frequency component is pronounced at wheel speeds above, for example, 10 mph. At low frequencies the amplitude of this noise component is minimal. The use of a high pass filter below 10 mph, for example, would cause undesirable attenuation of the digital component. Therefore, switch means 37 couples in the high pass filter at speeds above 10 mph and bypasses the high pass filter 39 at lower speeds. Signal preparation means 44 communicates with switch means 37 for providing a speed reference. Switch means 37 typically includes solid state switching elements. High pass filter 39 may include an operational amplifier as an active filter element.

Signal preparation means 44 generally comprises interface means 42 and digital counter 48. Signal preparation means provide a digital representation of traction motor speed to the program control 54 in response to a filtered signal from filter 38. Interface means 42 generally comprises in the preferred embodiment a Schmitt trigger 43 followed by a one-shot multivibrator 45. The Schmitt trigger 43 squares the filtered signal. Multivibrator 45 further squares the signal to provide a fast rise time required for digital counter 48. Also, multivibrator 45 aids in further filtering of noise components. Typically, multivibrator 45 has a 1 millisecond recycle time. Thus extraneous noise components arriving at multivibrator 45 within one millisecond are not counted. Multivibrator 45 compatibly couples Schmitt trigger 43 to digital counter 48.

Digital counter 48 counts pulses over a fixed interval. A clock sets counter 48 to count for 6 seconds and remains dormant for 1.3 seconds, for example. The cycle of 7.3 seconds is selected to provide a sufficient time to average errors caused by wheel slippage, yet is short enough to allow a reasonably frequent sampling rate. The digital count obtained is fed to the program control 54.

Program control 54 preferably comprises a decoding matrix 80 and a plurality of flip flops 82 followed by a series of latching registers 84. The decoding matrix 80 may comprise one or more integrated circuit chips which provide a selection of energized outputs corresponding to the count of digital counter 48, fed to the matrix 80. The outputs of the matrix 80 are fed through a plurality of toggles or flip flops 82 corresponding to the outputs. The flip flops are set or reset upon signals from decoding matrix 80. At fixed intervals, control logic 72 gates the state of flip flops 82 to latching registers 84. The intervals may, for example, represent the time at which a digital count is complete and an allowable minimum time between transitions have elapsed.

Relay means 56 may comprise first relay means or reed relays 86 and second relay means or transistor switches 88. Reed relays 86 isolate the solid state circuitry from transition relays 24 and large transients. Transistor switches 88 provide usable current levels, such as on the order of one ampere or 74 volts, for energizing transition relays. Typically, each of reed relays 86 are correspondingly coupled to transistor switches 88. Protection is provided for transistor switches 88 such as by coupling diodes 87 across the outputs of the transistors.

Transition relays 24 represent the internal relays of the locomotive. Transition relays 24 are used to control the wiring of both shunt resistors 26 and traction motor windings 29.

Very high currents, for example on the order of 1,000 amperes at 1,000 volts, are conducted through transition relays 24. Delay means 90 is used to increase the life of the contactors (not shown) of transition relays 24 by causing transitioning, or the actuation or deactuation of transition relays 24, to occur at low or zero current levels. This is accomplished by dropping the current in the excitation coils 106 of the generator and opening the field coil circuit 114 upon an interval or event prior to transitioning. Delay means 90 may use the solid state timing and signal controls of program control 54 or delay control 92. However, it should be recognized that the actuation of delay means 90 by mechanical or electrical events is also within the scope of this invention. Delay means 90 comprises, for example, a rheostat 102 or other variable impedance device and solenoid means 100. Solenoid means 100 is physically linked to the impedance varying wiper 104 of rheostat 102. The fixed resistance of rheostat 102 is coupled across locomotive batteries 116 which are typically 74 volts. Excitation relay 108 and excitation coil 106 comprise a series circuit with a variable resistance of rheostat 102. Excitation coil 106 is internal to the main generator 22. A second excitation coil 114, internal to the main generator 22, is in series with excitation relay 110.

In operation, control logic 72 generates a signal indicating that a transition is about to occur. Delay control 92 responsive to control logic 72 energizes solenoid 100 which gradually drives variable resistance wiper 104 of rheostat 102 to zero. Excitation coil 106 must be energized to develop a current through generator 22. Thus, as the solenoid moves the wiper arm dropping the voltage across excitation coil 106, the generator current is reduced. The generator 22 stores an amount of energy which cannot be dissipated instantaneously. The excitation relays 108, 110 are opened after a portion of the remaining energy of the generator is dissipated. After another delay, typically 2 seconds, delay control 92 allows transition relays to couple or decouple. The excitation relays are closed and the solenoid 100 is de-energized allowing generator 22 to transmit power through transition relays 24. Thus transitions may occur with zero or low current flowing through the transition relay contactors.

Typically in a transition programmer it is desirable to have a number of transitions in addition to the number of possible motor winding configurations. To enable intermediate transitions between particular motor winding hookup configurations, field shunt resistors 26 are connected across the motor windings 29. The transition relays 24 couple the shunt resistors 26 to the motor windings at appropriate minor transition speeds.

The typical diesel-electric locomotive utilizes dynamic braking. Traction motor windings are wired to energy dissipating resistors 27. The rotating traction motors act as generators and develop a voltage across their windings. The dissipating resistors 27 place a load on the motors. The traction motors provide a retarding force while the energy is dissipated through the resistors 27. Limited voltage is developed across the traction motor windings 29 at lower speeds. In a preferred embodiment, the transition programmer decreases the dissipating resistances to traction motor windings 29 enabling dynamic braking to occur at low speeds. The resistors 27 are coupled to associated transition relays 24. Relays 24 are energized at appropriate speeds in accordance with outputs selected by decoding matrix 80.

In practice, the transistion programmer should limit the frequency of major transitioning. During a transition there is a loss of power causing a slight decrease in speed. It is undesirable for the transition programmer to sense the temporary decrease in speed and thereby cause another major transition to occur. Thus a hysteresis circuit is provided in the preferred embodiment which prevents major transitions from occurring more than, for example, once per minute. The hysteresis circuit prevents chattering of transition relays and increases the reliability of the transition programmer.

The timing cycle of the transition programmer may be in excess of five seconds. If the engineer changes throttle positions, there may be a delay for the period of the timing cycle before a transition occurs. Often, the engineer desires to cause the locomotive to accelerate with minimal delay. A frequency divider 51 may be used with the clock oscillator to bypass this delay. For example, during the normal transitioning cycle the frequency divider 51 is coupled to the clock oscillator 50 for controlling the count interval of digital counter 48. However, when it is desired to quickly accelerate or decelerate, the frequency divider is bypassed as indicated by dashed line 49. Thus, a digital count is quickly obtained and transitioning occurs shortly thereafter. It should be realized that the usual lengthy time interval is selected to obtain a desirable accuracy in speed measurement. 5 seconds allows for averaging and compensating for such error causing factors as wheel slippage. Thus, accuracy will suffer when the shorter time interval is used; however the shorter time interval does provide a first approximation to the speed of the locomotive and allows initially, the rapid communication of power to the traction motors.

Although this invention provides a high reliability transition programmer, it is suggested that protection circuits be included. Such a protection circuit is schematically indicated in FIG. 3. Protection logic 120 of control logic 72 communicates with transition relays 24 and excitation relays 108 and 110 of delay means 90. The state of transition relays 24 or the excitation relays 108, 110 are sensed such as by additional contactors on transition relays 24 (not shown).

Since current levels on the order of 1,000 amperes and 1,000 volts are conducted through transition relays 24, the possibility exists that the relay contacts could weld together. If, following a transition, the transition relays are not properly energized or de-energized, that condition is sensed by the protection logic 120. Protection logic 120 causes all transition relays to open and further opens excitation relays 108, 110.

It is desirable to provide maintenance personnel with means to determine whether the transition programmer is working properly. This is accomplished by providing a display of lights corresponding to the state of the various relay drivers 56. A digital signal corresponding to a particular speed, such as, for example, 65 mph is fed by a speed simulator 122 to program control 54. Alternately, the clock oscillator 50 may communicate via dashed line 130 to the digital counter 48, simulating a speed corresponding to the frequency of clock oscillator 50. Test logic 124 communicating with relay drivers 56 causes light emitting diodes 126 to display the state of the relay drivers 56. The maintenance personnel then compares the illuminated diodes with a list of transition elements which should be energized at 65 mph.

Another circuit is useful for the maintenance personnel to test the operability of the transition programmer. A digital signal is generated which corresponds to an accelerating wheel speed by speed simulator 122. The speed simulator 122 communicates with program control 54. Light emitting diodes 126 indicate the state of relay drivers 56 at various simulated wheel speeds. Light emitting diode 128 flashes at intervals corresponding to 0.625 mph increments, for example, allowing the maintenance personnel to determine the speeds at which the relay drivers 56 are engaged. Thus the maintenance personnel has a check on the operability of the transition programmer logic.

It is preferable that the transition programmer be accessible for repair even though it is designed for high reliability. Accessibility is provided, for example, by mounting the axle transducer on the locomotive axle journal (not shown). The transducer including axle gear 32 and magnetic sensor 34 is encased in a steel box (not shown) and affixed on the exterior of the journal box. Further protection from the locomotive environment is obtained by potting sensor connections with epoxy or other suitable material. The electronic circuits are mechanically isolated from their mounting surface in another steel box housing by shock mounts (not shown) such as neoprene for example.

It is desirable to minimize maintenance time and hence down time of the locomotives. Maintenance may be facilitated by mounting the solid state electronic circuits on a plurality of removable modular plug-in circuit boards in the transition programmer housing. Universal or modular construction allows the single transition programmer unit to be usable with a variety of diesel locomotives having different transitioning elements.

For example, programmers may be quickly adapted to a specific model locomotive by simply inserting the proper matrix board or boards. Each matrix board or boards is designed for transitioning at particular speeds and for particular configurations of transitioning elements.

While the invention has been particularly shown and described with reference to a preferred embodiment thereof, it will be understood by those skilled in the art that various changes in the form and details thereof may be made therein without departing from the spirit and scope of the invention.

What is claimed is:

1. A transition programmer, for use in a locomotive having a plurality of electric traction motors and energy means for providing power to said traction motors, said energy means having current and voltage limitations, comprising:
   sensing means for generating a waveform having a digital component corresponding to a rotational speed developed by at least one of said traction motors;
   digital signal processing means coupled to said sensing means for selectively energizing relay means in response to said digital component comprising:
   count preparation means;
   count means for developing a digital representation corresponding to a speed of said electric traction motors in a given time interval, said count preparation means isolating and compatibly coupling said digital component to said count means; and programming means responsive to said signal processing means energizing relay means at selected times in accordance with the digital count representation; relay means coupled to said processing means for selectively engaging a combination of circuit elements for providing an optimal power to said electric traction motors within said limitations of said energy means; and
   delay means for decoupling said transition relays from said energy means during transitioning comprising:
   variable impedance means coupled to a power source and an excitation coil of the energy means for varying the current through said excitation coil;
   solenoid means coupled to said programming means and to said variable impedance means for reducing the current through said excitation coil prior to transitioning; and
   delay relay means coupled to said excitation coil for dropping the voltage across said excitation coil prior to transitioning.

2. The invention as set forth in claim 1 and having, simulator means for generating a digital signal corresponding to an accelerating traction motor speed;

means for coupling said signal to said digital signal processing means;
   relay indicating means associated with said relay means and responsive to said processing means;
   said relay indicating means for indicating the state of energization of the relay means in accordance with the digital signal corresponding to an accelerating traction motor speed, and means for displaying an indication of a simulated traction motor speed corresponding to said digital signal.

3. A transition programmer for use in a locomotive having an energy source and a plurality of traction motors having windings energizable by said energy source and in which said energy source having voltage and current limitations, comprising:
   digital sensing means for measuring a speed of rotation of at least one of said traction motors;
   filter means for generating a signal, responsive to said digital sensing means, with attenuated noise components;
   digital count means for providing a digitally energized output corresponding to said speed of rotation;
   interface means for compatibly coupling said filter means with said count means;
   programming means for providing at predetermined intervals selectively energized outputs in accordance with the digital output of said count means;

relay means responsive to said programming means for engaging a selected combination of locomotive circuit elements,
   said programming means comprising:
   a decoding matrix communicating with said output;

control logic communicating with said digital count means for defining a count interval;
   clock means communicating with said control logic for timing said control logic; and
   protection means for decoupling locomotive circuit elements in response to an indication of failure of an attempted transition after a predetermined interval.

4. The invention as set forth in claim 3 and having, a plurality of dissipating resistor means selectively energizable by energized locomotive circuit elements;
   said dissipating resistor means for providing a dynamic braking load to windings of at least one of said traction motors.

5. In a diesel electric locomotive, a transition programmer comprising:
   a digital speed transducer coupled to a digital signal processor;
   said digital signal processor comprising:
   filter means for suppressing noise signals, including high pass means for removing low frequency noise components;
   switch means for coupling said high pass means at a predetermined frequency to said filter means and said interface means;
   count means for obtaining a digital representation of the speed sensed by said transducer;
   interface means for compatibly coupling said filter means with said digital count means; and
   programming means for selectively energizing a plurality of outputs corresponding to the velocity sensed by said transducer, said programming means including clock means cooperating with said count means; and wherein the transition programmer further comprises:
   a plurality of first relay means for isolating said digital signal processor from relatively higher current-higher voltage circuitry of said locomotive, said first relay means coupled to said programming means; and second relay means correspondingly coupled to a plurality of outputs of said first relay means for amplifying currents of said outputs.

6. In a locomotive having a plurality of electrical traction motors and energy means for providing power to said traction motors, said energy means having current and voltage limitations, the combinations therewith of:

sensing means for generating a waveform having a digital component corresponding to a rotational speed developed by at least one of said traction motors;

signal preparation means responsive to said waveform;

programming means responsive to said signal preparation means;

said signal preparation means for forming a digital count representation compatible with said programming means;

said programming means for energizing at selected times, relay means in accordance with the digital count representation;

said programming means comprising:

matrix means for decoding said digital count;

register means for storing decoded information over fixed intervals;

means for gating the information stored in said register means to relay means;

relay means coupled to said register means for selectively engaging a combination of circuit elements for providing an optimal power to said electric traction motors within said limitations of said energy means.

7. A transition programmer in a diesel electric locomotive having a plurality of electric traction motors and at least one energy source for driving said traction motors comprising:

a gear having a plurality of teeth cooperating with an axle rotatable by at least one of said traction motors;

magnetic sensing means for generating a waveform having a digital component corresponding to a relative motion of said teeth with respect to said sensing means, said waveform having amplitude peaks corresponding to a velocity of said relative motion;

filter means coupled to the sensing means for attenuating noise components of the waveform and for stabilizing the amplitude peaks;

a Schmitt trigger coupled to the filter means;

a one-shot multivibrator coupled to the Schmitt trigger;

digital count means coupled to the one-shot multivibrator for providing a digital count representation;

a clock oscillator means coupled to the digital count means for defining a cycle over which the digital count means provides the digital count representation;

decoding means coupled to the digital count means for selectively energizing a plurality of memories according to said digital count representation and a predetermined program;

toggle means coupled to said decoding means for temporarily storing the output state of the decoding means;

latch means coupled to the toggle means for remembering the state of the toggle means for fixed intervals;

control means gating the state of the toggle means to the latch means at said fixed intervals;

solid state switch means for selectively energizing transition relays;

a plurality of reed relays coupling the state of said latch means to said solid state switch means;

delay means for temporarily causing a decoupling of excitation coil means of said energy source during transitioning;

said transition relays coupled to said solid state switch means for selectively coupling a combination of locomotive circuit elements.

8. A method of transitioning a locomotive comprising the steps of:

sensing representations of discrete displacements corresponding to the rotation of a wheel communicating with the locomotive;

processing the sensed representations for selectively setting a plurality of locomotive transition elements wherein the step of processing includes removing noise components from sensed representations, counting a plurality of the representations sensed over an interval, communicating the count thereby obtained with a modular decoding matrix having a plurality of inputs and outputs, and decoding the count, thereby selectively energizing and de-energizing the plurality of outputs; and actuating a plurality of isolation elements for setting corresponding locomotive transition elements.

* * * * *